UNITED STATES PATENT OFFICE.

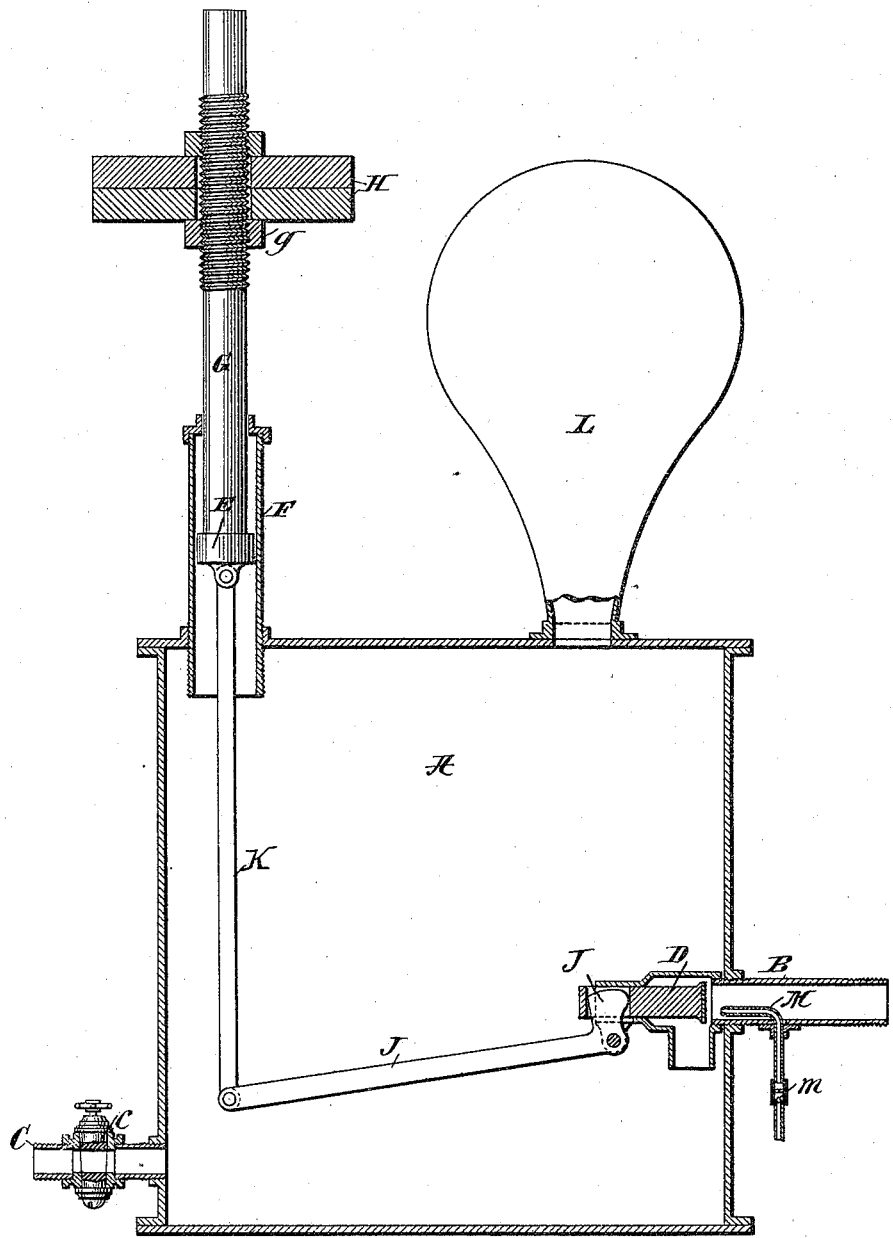

EDGAR JADWIN, OF HONESDALE, PENNSYLVANIA.

PRESSURE-REGULATOR.

SPECIFICATION forming part of Letters Patent No. 533,173, dated January 29, 1895.

Application filed February 14, 1894. Serial No. 500,135. (No model.)

*To all whom it may concern:*

Be it known that I, EDGAR JADWIN, a citizen of the United States, residing at Honesdale, county of Wayne, and State of Pennsylvania, have invented certain new and useful Improvements in Pressure-Regulators, fully described and represented in the following specification and the accompanying drawing, forming a part of the same.

This invention relates to pressure regulators intended mainly for use on water systems to reduce and regulate the pressure in house service pipes, although the construction is applicable to other uses and with other fluids than water.

The object of the invention is to provide an improved pressure regulator for non-compressible fluid from which the fluid shall be delivered at a desired reduced pressure, and especially to provide a pressure regulator for non-compressible fluids which shall operate practically without water jar, or water hammer, and which shall prevent the pressure from rising above the desired pressure even when the outflow of the fluid is entirely checked. These objects are accomplished by using a valve closing against the inlet pressure; by providing an elastic cushion arranged to take up any sudden jar or shock in the fluid and by an improved means for controlling the regulating valve; some of which features of the invention may be used with or without one or more of the others, as claimed hereinafter; and the invention consists in various constructions, combinations, and arrangements of these and other parts, for a full understanding of which a detailed description will now be given in connection with the drawing which forms a part of this specification, and which shows an embodiment of the various parts of the invention in a preferred form.

The drawing shows a sectional view of a regulator embodying the features of my invention, the parts being shown in the position assumed when the valve is partially open.

In the drawing, A is a chamber provided with an inlet pipe B and an outlet pipe C, the outlet pipe being shown as provided with a cock or valve c of any suitable form. The inlet pipe is controlled by a valve D which is shown as adapted to close against the inlet pressure and as seating directly on the end of the inlet pipe, and which is controlled by the movement of a valve regulating piston or plunger E which rides in a cylinder F mounted in the top of the chamber A. The piston or plunger E carries a rod G which extends above the cylinder F to receive a number of removable weights H which rest on a collar g on the rod. I prefer to form the connection between the piston E and the valve by means of a bell crank lever J having a long and a short arm, the short arm engaging the valve and the long arm being connected to the piston E, as by a link K. The outlet C is preferably smaller than the inlet B, as shown, for the purpose hereinafter explained.

The operation of the parts thus far described is as follows: The piston being suitably weighted for the desired outlet pressure, and the regulator being empty of water, the valve will be open, the piston E having fallen in the cylinder F. If now, the outlet being closed, water be admitted to the inlet pipe B, it will flow into the chamber A until the pressure in the chamber A has become sufficient to exert a force on the piston E and on the valve D sufficient to move the valve against the force exerted by the weights H and the inlet pressure on the valve, the piston will rise and the valve will close the inlet. This will happen when the desired outlet pressure has been reached, as determined by the amount of weight on the rod G. If now, the outlet be opened, the outflow of the water tends to reduce the pressure in the chamber A, but, as soon as the pressure begins to fall below the desired pressure, the piston E will begin to fall, the valve D being thereby gradually opened, which opening will continue until the inflow is equal to the outflow, when the valve will remain nearly stationary, moving just enough, as the outflow varies or the inlet pressure varies, to keep the inflow just equal to the outflow and maintain the desired outlet pressure. If the outflow be decreased, the piston will rise and the valve will be partly closed to reduce the inflow; and if the outflow increase, the piston will fall and the valve will be opened farther. It will thus be seen that so long as the outflow is not greater than the possible inflow, the desired outlet pressure will always be maintained if the inlet pressure is equal to or greater than the desired outlet pressure, and when the inlet pressure is less than the desired outlet pressure, the outlet pressure will remain the same as the inlet pressure, the valve then remaining wide open. A convenient way of insuring that the outflow shall always be less than the possible inflow, is to make the outlet pipe smaller than the inlet pipe, as shown, but this is not necessary as the outlet may be reduced below the size of the pipe in any suitable manner. It will also be noticed that the inlet valve D is controlled by the pressure in the chamber A, and that the pressure in the chamber A is the desired outlet pressure.

By using a valve which closes against the inlet pressure, such as the one shown, the inlet pressure is utilized to combine with the weights to open the valve when the pressure in the chamber A is reduced, thus securing a freer and more rapid action of the valve whereby the variations of pressure in the chamber A are greatly reduced, all sticking of the valve being avoided and the action of the valve rendered positive.

Other forms of valves closing against the inlet pressure may be used instead of that shown. It will be understood however, that I may use in connection with the other features of the invention a valve which is not affected by the inlet pressure, such as a slide valve or an oscillating valve.

Instead of the weights being carried directly by the piston, as shown, it will be understood that a weighted lever may be arranged to bear on the piston, or the piston may be spring pressed, with nearly the same result as in the construction here shown, but the spring construction is inferior to that employing weights as the spring pressure is not uniform, or in place of a piston, I may use a diaphragm, which may be spring pressed or weight pressed in any suitable manner, or may be of suitable elastic material, and may be connected to the valve by the means shown, or by other suitable means, all as will be readily understood by one skilled in the art; but the construction shown is preferred, and in itself forms a part of the invention.

It will be perceived that, as the pressure in the regulator is constant, water will be maintained under pressure at a desired level above the regulator ready for use, the pressure being determined by the weight on the piston. The object of having a large outlet pressure water chamber A is to give room for the lever and link to work in. If other means be used connecting the valve with the piston, or its equivalent, which require less room, the size of the chamber may be proportionately reduced. The chamber may be of any convenient form.

When the outflow is checked, the inlet valve will be closed, but there is likely to be a slight leakage past the valve, by which the pressure might be raised above the desired pressure. To avoid this, I provide that there shall be a continuous leakage from the chamber or outlet pipe (at least when the outflow is checked) which shall be equal to or a little greater than the leakage past the valve. I prefer to provide for this leakage by having the valve actuating piston fit loosely enough in its cylinder to allow sufficient leakage past the piston between the piston and the cylinder, as by this arrangement the piston will always be kept perfectly lubricated and all possibility of the piston sticking avoided; but it is evident that the leakage may be provided for in any other suitable manner, as by a drip cock or other small opening at any suitable place in the chamber or outlet pipe. Suitable means may be provided to carry away the drip, but as the necessary leakage will generally be very small, this will in most cases not be necessary.

To prevent water jar, I provide my regulator with an elastic cushion, preferably bearing on the water in the chamber A, and which is preferably an air cushion furnished by an air chamber L communicating with the interior of the water chamber A, as shown.

The elastic cushion formed by the air compressed in the chamber L prevents water jar by absorbing any sudden increase of pressure in the chamber A, as by the outflow being suddenly checked, so that the valve is closed slowly and gently instead of suddenly as it otherwise would be. It also acts to prevent pulsations in the outlet and connecting pipes which might otherwise be caused by the opening and closing of the valve.

An elastic cushion may be used for the purpose described in combination with other forms of pressure regulators for non-compressible fluids, and such combinations are within the invention.

Instead of providing a separate air chamber, as shown, the upper part of the chamber A may be adapted to serve as an air chamber. This is provided for in the particular construction shown in the drawing by the cylinder F being extended down from the top of the chamber A far enough to provide sufficient space in the chamber A above the bottom of the cylinder to serve as an air space. Otherwise the air under compression would soon escape around the piston E, which, as before stated, fits loosely enough in the cylinder F so that the leakage past the piston shall be equal to or greater than the leakage past the valve when it is closed, to prevent the outlet pressure rising when the outflow is checked. The chamber A may, of course, be of any other suitable form than that shown to provide a sufficient air space above the bottom of the cylinder E. Such an air space in the upper part of the water chamber will be sufficient in many cases; but I find in practice, when the regulator is in use for long periods at a time, the pressure in the chamber being constantly maintained and water being drawn from the outlet more or less frequently, that it is not well to have the compressed air exposed to such a large surface of water as it is when the upper part of the chamber A is utilized as an air space, as the compressed air will gradually be carried away by the water circulating in the chamber A and pass out through the outlet. I therefore prefer to provide my regulator with a separate air chamber communicating with the chamber A, as shown in the drawing, and this air chamber should preferably have a comparatively small opening into the chamber A. I also prefer to have the cylinder F extend down a sufficient distance from the top of the chamber A, when I provide a separate air chamber, so that there shall always be sufficient air in the regulator to be compressed in the air chamber to prevent the water rising higher than just within the mouth of the air chamber, as indicated by a dotted line in the drawing, as a larger air cushion and smaller area of contact between the air and water are thus secured than if the water were allowed to extend far within the air chamber.

By providing a means whereby sufficient air could be introduced into the regulator to make good the loss of air carried away by the outflowing water, an air chamber separated from the chamber A by a small passage or opening would not be necessary. I have shown such a means consisting of a small air inlet pipe or nozzle M extending into the inlet pipe B, provided with a check valve $m$ and having a very fine opening into the inlet B in the direction of the flow of the water when the valve D is open, so that the water flowing past the opening in the nozzle M will carry with it into the chamber A a small quantity of air which will rise to replenish the air compressed in the upper part of the chamber in sufficient quantities to make good the loss caused as before explained. Any excess of air thus admitted into the chamber A will escape around the piston E. Even when a second air chamber is used, it may be found advisable to use such a means for replenishing the compressed air, as it may be found that the air compressed in the air chamber will after a great while be wholly or partly absorbed and carried away by the water circulating through and flowing out of the regulator; but when a separate air chamber is used, this may not be required, as the air held within the incoming water may be found sufficient to compensate for loss in the air chamber. Other suitable means for introducing air into the regulator may be used, but the means shown is preferred.

A further advantage of making the inflow pipe larger than the outflow pipe is that the necessary movement of the valve to regulate the inflow is thereby reduced, and consequently less momentum is acquired by the piston G and valve D and connecting parts when the pressure suddenly rises in the chamber from any cause, such as the stoppage of the outflow of the water, this tending further to eliminate the water jar. By reason of the increased power exerted by the rise and fall of the piston G on the valve D through the long and short armed lever J, I am enabled to use a much smaller valve actuating piston and less weight on the piston than otherwise, and thus provide for a more delicate action of the regulator.

Although the invention is especially intended for use where water is the fluid whose pressure is to be reduced and regulated and has been described with reference to such use, yet it is to be understood that the invention is applicable to use with other non-compressible fluids.

Various modifications of the construction and combinations of the parts herein described will suggest themselves to one skilled in the art, and such modifications are within the invention.

The terms "water" and "air" as used in the claims are to be understood as meaning respectively any non-compressible fluid and any compressible fluid.

What I claim is—

1. The combination with a fluid pressure regulator for non-compressible fluids having an outlet pressure chamber, of an air cushion bearing on the top of the fluid in the outlet pressure chamber of the regulator, substantially as described.

2. The combination with an outlet pressure water chamber having an outlet smaller than the inlet, of a valve controlling the inlet and controlled by the pressure in the chamber, and an air cushion bearing on the top of the water in the water chamber, substantially as described.

3. The combination with an outlet pressure water chamber, of a valve controlling the inlet and controlled by the pressure in the water chamber, and an air chamber separate from the water chamber and communicating with the top of said water chamber through a small opening whereby a small surface contact between the air and the water is secured whenever the water fills the water chamber, substantially as described.

4. The combination with an outlet pressure water chamber having its upper part adapted to act as an air space, of a valve controlling the inlet and controlled by the pressure in the water chamber, and an air chamber separate from the water chamber and communicating through a small opening with the air space in the upper part of the water chamber, substantially as described.

5. The combination with an outlet pressure water chamber, of a valve controlling the inlet, a cylinder having one end open to the interior of the water chamber at some distance from the top of said chamber so as to leave an air space in said chamber above the open end of said cylinder, a piston adapted to reciprocate in said cylinder, connections between said piston and the valve whereby when the piston is moved outward by the pressure in the water chamber the valve will be closed, means for exerting a yielding inward pressure on said piston, and an air chamber separate from the water chamber and communicating through a small opening with the air space in the upper part of the water chamber, substantially as described.

6. The combination with an outlet pressure water chamber, of a valve controlling the inlet and controlled by the pressure in the water chamber, an air cushion independent of the valve connections bearing on the water in the water chamber, and an air inlet for replenishing the air forming the air cushion, substantially as described.

7. The combination with an outlet pressure water chamber, of a valve controlling the inlet and controlled by the pressure in the water chamber, an air cushion bearing on the water in the water chamber, and an air inlet entering the water inlet in the direction of the inflow of the water and provided with a check valve opening inward, substantially as described.

8. The combination with an outlet pressure water chamber, of a valve controlling the inlet and controlled by the pressure in the chamber and arranged to close against the inlet pressure, and an air cushion bearing on the top of the water in the water chamber, substantially as described.

9. The combination with an outlet pressure water chamber, of a valve controlling the inlet and arranged to close against the inlet pressure, a cylinder having one end open to the interior of the fluid chamber, a pressure piston adapted to reciprocate in the cylinder, an air cushion bearing on the top of the water in the water chamber, and a lever having one arm connected to the piston and the other arm of which operates the valve so that when the piston is moved outward the valve will be closed, substantially as described.

10. The combination with an outlet pressure water chamber, the outlet being smaller than the inlet, and an air cushion bearing on the water in the water chamber, of a valve controlling the inlet and arranged to close against the inlet pressure, a cylinder having one end open to the interior of the water chamber, a pressure piston adapted to reciprocate in the cylinder and a lever having one arm connected to the piston and the other arm of which operates the valve, so that when the piston is moved outward the valve will be closed, substantially as described.

11. The combination with the water chamber A having an inlet B and an outlet C, of a valve D, cylinder F, pressure piston E, lever J connecting the piston and the valve, the air inlet pipe M entering the water inlet B in the direction of the inflow of the water and provided with a check valve $m$, and the air chamber L, substantially as described.

12. The combination with the outlet pressure chamber A having an inlet B and the sliding plunger valve D closing against the inlet current, of bell crank lever J having a long and short arm, the short arm being connected to the valve D by a double acting joint whereby the latter is moved in both directions in a straight line by the lever, and a movable pressure device controlled in position by the pressure in the chamber and connected to the long arm of the lever to close and open the valve respectively against and with the inlet pressure as the pressure device moves with or against the pressure in the chamber.

In testimony whereof I have hereunto set my hand in the presence of two subscribing witnesses.

EDGAR JADWIN.

Witnesses:
T. F. KEHOE,
T. J. SAWYER.